United States Patent
Simelgor et al.

(10) Patent No.: US 7,755,049 B2
(45) Date of Patent: Jul. 13, 2010

(54) TUNABLE MICROCANTILEVER INFRARED SENSOR

(75) Inventors: Gregory Simelgor, Ithaca, NY (US);
Scott R. Hunter, Oak Ridge, TN (US);
Shankar Radhakrishnan, Ithaca, NY (US)

(73) Assignee: Agiltron, Inc., Woburn, MA (US)

( * ) Notice: Subject to any disclaimer, the term of this patent is extended or adjusted under 35 U.S.C. 154(b) by 0 days.

(21) Appl. No.: 11/688,745

(22) Filed: Mar. 20, 2007

(65) Prior Publication Data

US 2008/0230698 A1 Sep. 25, 2008

(51) Int. Cl.
*G01J 5/02* (2006.01)

(52) U.S. Cl. ............... 250/339.03; 250/338.1; 250/339.02; 250/332; 250/336.1; 250/338.4

(58) Field of Classification Search ........... None
See application file for complete search history.

(56) References Cited

U.S. PATENT DOCUMENTS

| | | | |
|---|---|---|---|
| 5,844,238 A | 12/1998 | Sauer et al. | |
| 6,118,124 A | 9/2000 | Thundat et al. | 250/332 |
| 6,339,219 B1 | 1/2002 | Ishizuya et al. | |
| 6,469,301 B1* | 10/2002 | Suzuki et al. | 250/338.1 |
| 6,835,932 B2* | 12/2004 | Ishizuya et al. | 250/338.1 |
| 2007/0120058 A1* | 5/2007 | Blackwell et al. | 250/338.1 |

OTHER PUBLICATIONS

Corbeil et al., "Self-leveling" uncooled microcantilever thermal detector, Applied Physics Letters, Aug. 12, 2002, 1306-1308, vol. 81, No. 7, American Institute of Physics.
Tohru Ishizuya et al, 160x120 Pixels of Optically Readable BiMaterial Infrared Detector, IEEE, pp. 578-581, 2002 IEEE.
J. Zhao, High Sensitivity Photomechanical MW-LWIR Imaging using an Uncooled MEMS Microcantilever Array and Optical Readout, Infrared Technology and Applications XXXI, pp. 506-513, SPIE, vol. 5783, Bellingham, WA.
Tohru Ishizuya, et al., Optically Readable Bi-material Infrared Detector, Infrared Technology and Applications XXVII, pp. 342-349, SPIE vol. 4369, 2001.

* cited by examiner

*Primary Examiner*—David P Porta
*Assistant Examiner*—Yara B Green
(74) *Attorney, Agent, or Firm*—Burns & Levinson LLP; Jacob N. Erlich; Orlando Lopez

(57) ABSTRACT

An electromagnetic radiation sensor that exhibits improved performance by virtue of an ability to tune its sensitivity is disclosed. The electromagnetic radiation sensor incorporates thermal actuators that act in opposition to one another, but which have a slight difference in responsivity. A temperature controller is used to tune the sensitivity of the electromagnetic radiation sensor by controlling the temperature of the substrate on which the sensor is formed.

14 Claims, 4 Drawing Sheets

TUNABLE MICROCANTILEVER INFRARED SENSOR

CROSS REFERENCE TO RELATED APPLICATIONS

The underlying concepts, but not necessarily the language, of the following case is incorporated by reference: U.S. patent application Ser. No. 11/279,954, filed 17 Apr. 2006. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to radiation sensors in general, and, more particularly, to MEMS electromagnetic radiation sensors.

BACKGROUND OF THE INVENTION

A digital camera typically utilizes a two-dimensional array of sensors, each of which converts incident radiation into an electrical signal. The array of sensors is typically disposed at the focal point of a lens, thereby defining a "focal plane array." Infrared cameras include sensors that are sensitive to electromagnetic radiation having wavelengths longer than about 0.8 microns. Traditionally, infrared cameras have been based upon microbolometer technology. A microbolometer is an extremely small heat sensor, comprising materials such as vanadium-oxide or amorphous silicon, whose electrical resistance changes when it receives radiation of a specific wavelength. Microbolometers, however, exhibit self-heating effects, poor sensitivity, and generate electrical noise. To overcome these problems, capacitive radiation sensors based on Micro Electro Mechanical Systems (MEMS) technology have been developed.

In a typical MEMS-based radiation sensor, a paddle or plate is supported above a substrate by thermal-bimorph support arms. At least a portion of the plate and the underlying substrate are electrically conductive, thereby serving as electrodes. The electrodes collectively define a "sensing capacitor," the capacitance of which is a function of the electrodes' separation distance.

In operation, the plate of each sensing capacitor receives infrared radiation and heats up. The heat is conducted to the support arms, which include elements that bend in response to being heated. These elements are known as "thermal bimorphs" and their response is known as the "thermal bimorph effect." Perhaps the most familiar thermal bimorph is the bimetallic strip within a thermostat. As the support arms bend, the plate moves up or down (depending on the design). Movement of the plate alters the spacing between the electrodes, thereby causing a change in the capacitance of the sensing capacitor. In this fashion, radiation that is incident on the plate is sensed as a change in capacitance. The change in capacitance is captured by read-out electronics and can be quantified and interpreted to provide an image, such as in an IR camera. (See, e.g., U.S. Pat. No. 6,118,124, etc.).

Early versions of these MEMS sensors, however, were highly sensitive to changes in ambient temperature. The sensor substrate, which provides a thermal connection to the environment outside the focal plane array, provides a conduit for heat to and from the support arm. Ambient temperature changes, therefore, resulted in a perceived change in background light level or sensor sensitivity across the sensor array.

To mitigate the problems due to temperature sensitivity, thermally-compensated MEMS sensors were developed. Such sensors have been disclosed by: 1) J. Zhao in "High Sensitivity Photomechanical MW-LWIR Imaging using an Uncooled MEMS Microcantilever Array and Optical Read-out," published Mar. 28, 2005; 2) T. Ishizuya, et al., in "160× 120 Pixels Optically Readable Bimaterial Infrared Detector," published Jan. 20, 2002; and 3) Corbeil et al., in "Self Leveling uncooled microcantilever thermal detector," published Aug. 12, 2002. In these devices, each support arm includes two thermal bimorphs designed to oppose one another in response to a slowly occurring change in temperature. Temperature compensation of up to 90-95% has been demonstrated with these devices.

Notwithstanding their improved resistance to temperature variation, thermally-compensated MEMS sensors do have some drawbacks. First, the responsivity of the opposing thermal actuators, as disclosed, is not identical. As a result, an ambient temperature change will still induce some small residual movement of the sensor paddle—as evidenced by the fact that only 90-95% compensation has been demonstrated. Second, variations in fabrication, material properties, material stress, etc., can lead to variation in device sensitivity from sensor array to sensor array.

SUMMARY OF THE INVENTION

The present invention provides a radiation sensor whose sensitivity can be tuned via a substrate temperature controller. This tunability translates into an ability to avoid complications due to variations in device performance among different focal plane arrays. It also enables real-time compensation of changes in ambient temperatures.

The radiation sensors disclosed herein comprise a radiation absorbing plate that is held above a substrate electrode via support arms. The support arms comprise thermal actuators which respond to a change in substrate temperature to change the spacing between the plate and the substrate. The plate and substrate electrode together compose a capacitor arrangement whose quiescent-state capacitance determines the sensor's sensitivity. The sensitivity is tunable, therefore, by controlling the temperature of the substrate.

Each support arm comprises a pair of mismatched thermal actuators. These actuators are arranged so as to counteract each other in response to slow changes of substrate temperature. By virtue of the mismatch in the thermal actuators, however, the support arms exhibit a small change of paddle height per degree of substrate temperature change.

In some embodiments, the mismatched thermal actuators comprise a pair of thermal bimorphs having slightly different responsivities. A substrate temperature controller is used to actuate the thermal bimorphs, and thereby controls the paddle height.

In some embodiments, each thermal actuator comprises a thermal bimorph that is connected to a substantially thermally-insensitive lever arm. The lengths of the lever arms within a support arm differ, however. By virtue of the difference in the length of the lever arms, the vertical displacement induced by one thermal actuator is larger than the vertical displacement caused by the opposing thermal actuator. As a result, the support arm exhibits a slight vertical displacement with a change in substrate temperature. A substrate temperature controller is used to actuate the thermal bimorphs, and thereby control the plate-to-substrate spacing. In some of these embodiments, the thermal bimorphs within a support arm have different responsivities as well, thereby further enhancing the responsivity of the support arm to temperature.

The illustrative embodiment of the present invention is a sensor array wherein each sensor comprises a substrate; a plate for converting incident radiation into heat, wherein the plate is physically adapted to conduct electricity and to conduct heat; a support arm for supporting the plate at a first height above the substrate, and wherein the first height is a function of a temperature of the substrate; and a temperature controller for controlling the temperature of the substrate.

DETAILED DESCRIPTION

The following terms are defined for use in this Specification, including the appended claims:

Mechanically-coupled means that two or more objects interact with one another such that movement of one of the objects affects the other object. For example, consider an actuator and a platform. When triggered, the actuator causes the platform to move. The actuator and the platform are therefore considered to be "mechanically-coupled." Mechanically-coupled devices can be, but are not necessarily, physically coupled. In particular, two devices that interact with each other through an intermediate medium are considered to be mechanically coupled. Continuing with the example of the platform and the actuator, if the platform supports a load such that the load moves when the platform moves (due to the actuator), then the actuator and the load are considered to be mechanically coupled as well.

Electrically-coupled means that two objects are in electrical contact. This can be via direct physical contact (e.g., a plug in an electrical outlet, etc.), via an electrically-conductive intermediate (e.g., a wire or conductive trace that connects devices, etc.), or via intermediate devices, etc. (e.g., a resistor Monolithically-integrated means formed either: in the body of a substrate, typically by etching into the substrate or; on the surface of the substrate, typically by patterning layers disposed on the surface.

Thermal Bimorph means a structure (e.g., beam, etc.) that exhibits thermal bimorph behavior (i.e., thermally-induced bending response). Thermal bimorph behavior can be created in single-layer (single material) structures, bi-layer (bi-material) structures, or in structures that have more than two layers comprising two or more materials. In other words, notwithstanding the prefix "bi," a thermal bimorph can have more or less than two discrete layers comprising more or less than two different materials.

Corrugations means a series of alternating ridges and trenches, wherein one ridge and one trench collectively define a "corrugation."

Other terms will be defined, as appropriate, throughout this specification.

Figure 1:
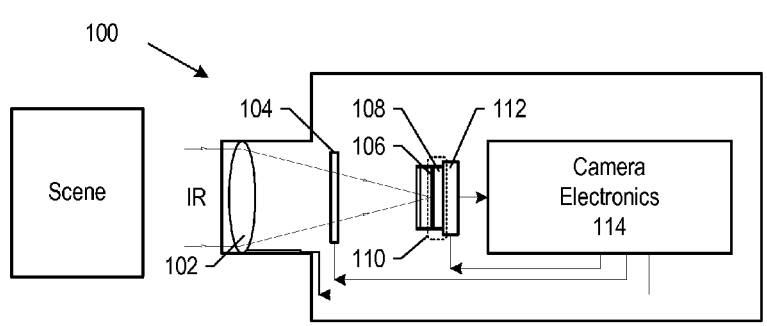
FIG. 1 depicts the salient elements of an infrared camera in accordance with an illustrative embodiment of the present invention.

FIG. 1 depicts the salient elements of an infrared camera in accordance with an illustrative embodiment of the present invention. Infrared camera 100 comprises infrared imaging optics 102, shutter 104, integrated focal plane array 110, temperature controller 112, and camera electronics 114, interrelated as shown.

Infrared imaging optics 102 include one or more lenses that receive radiant energy, such as infrared radiation. Infrared radiation that is received by infrared imaging optics 102 is directed toward shutter 104. The shutter controls the amount of radiation that is directed toward integrated focal plane array 110. Those skilled in the art will know how to make, specify, and use infrared imaging optics 102 and shutter 104.

Integrated focal plane array 110 comprises sensor array 106 and read-out integrated circuit ("ROIC") 108. Although in the illustrative embodiment sensor array 106 is monolithically-integrated with ROIC 108, it will be clear to those skilled in the art how to make and use alternative embodiments of the present invention wherein sensor array 106 is packaged with ROIC 108 using another appropriate technology such as:

i. hybrid integration technology; or
    ii. multi-chip module integration technology; or
    iii. conventional integrated circuit packaging; or
    iv. any combination of i, ii, and iii.

Sensor array 106 receives the radiant energy that is captured by infrared imaging optics 102 and admitted by shutter 104. Sensor array 106 is located at the focal point of infrared imaging optics 102 and is, therefore, properly termed a "focal plane array." As described later in this specification, sensor array 106 comprises an array of micromechanical capacitive sensors that respond to infrared radiation. These sensors have support arms that incorporate two thermal bimorphs and a thermal isolator, in accordance with the illustrative embodiment of the present invention.

In response to the received radiation, the capacitance of the various sensors of sensor array 106 changes. These capacitances are "read" or "extracted" by ROIC 108, in known fashion. ROIC 108 generates voltage signals that are indicative of the extracted capacitances. ROIC 108 performs various other functions as well, including signal conditioning and amplification. Those skilled in the art will know how to use ROIC 108 to extract the capacitance of the various sensors in sensor array 106 and provide a voltage signal indicative thereof.

Temperature controller 112 provides integrated focal plane array 110 with thermal isolation from its environment, other than from the received infrared radiation. Temperature controller 112 also proactively controls the temperature of integrated focal plane array 110, as described in more detail below and with respect to FIG. 3. Camera electronics 114 includes various amplification, offset, and gain-control electronics, multiplexing and analog-to-digital circuitry, a camera-control microprocessor, various external control electronics, digital read-out and the like. Concisely, camera electronics 114 receives the voltage signals from ROIC 108 and processes the signals into an image. Camera electronics 114 also control the focus of infrared imaging optics 102 and control shutter 104 and temperature stabilizer 112. Those skilled in the art will be familiar with the design and use of the various devices and circuits that compose camera electronics 114 and know how to integrate sensor array 106 therewith.

Figure 2:
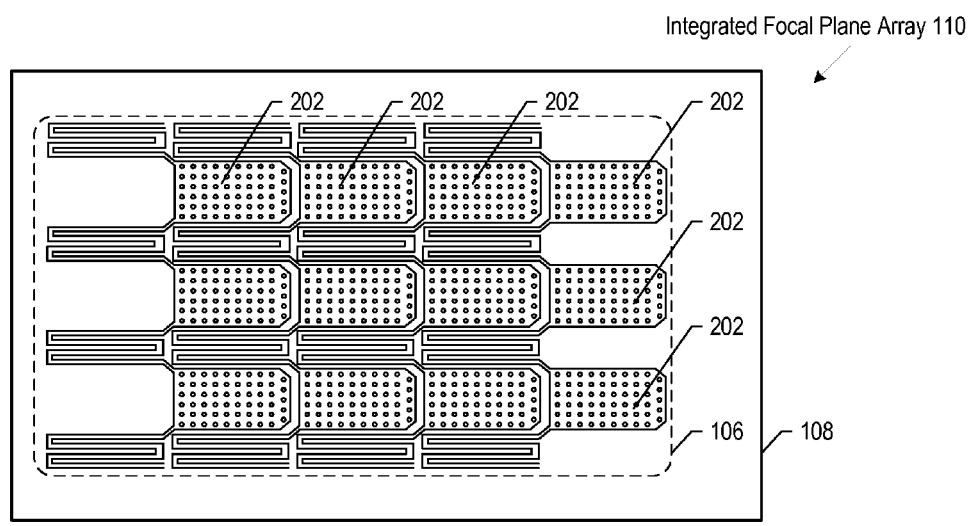
FIG. 2 depicts a plan view of a portion of a sensor array, in accordance with the illustrative embodiment of the present invention.

FIG. 2 depicts a plan view of a portion of a sensor array, in accordance with the illustrative embodiment of the present invention. Sensor array 106 comprises a plurality of closely-spaced capacitance sensors 202, each of which defines a "pixel" of the array. Only a few (twelve) sensors 202 are depicted in array 106. Sensor array 106 would typically be implemented as a much larger array, such as a 160×120 pixel array, which includes 19,200 sensors 202. Since individual sensors 202 are micron-sized, the array is formed on ROIC 108 via standard micromachining techniques. In some alternative embodiments (not depicted), the array is a linear array wherein sensors 202 are linearly arranged. Although the illustrative embodiment comprises a sensor array that is formed on an ROIC, it will be clear to those skilled in the art, after reading this specification, how to make and use alternative embodiments of the present invention wherein sensor array is formed on a substrate that is not an ROIC. Suitable substrates for supporting the formation of sensor array 106 sensors 202 include, without limitation, silicon substrates, gallium arsenide substrates, silica substrates, ceramic substrates, and glass substrates.

Figure 3A:
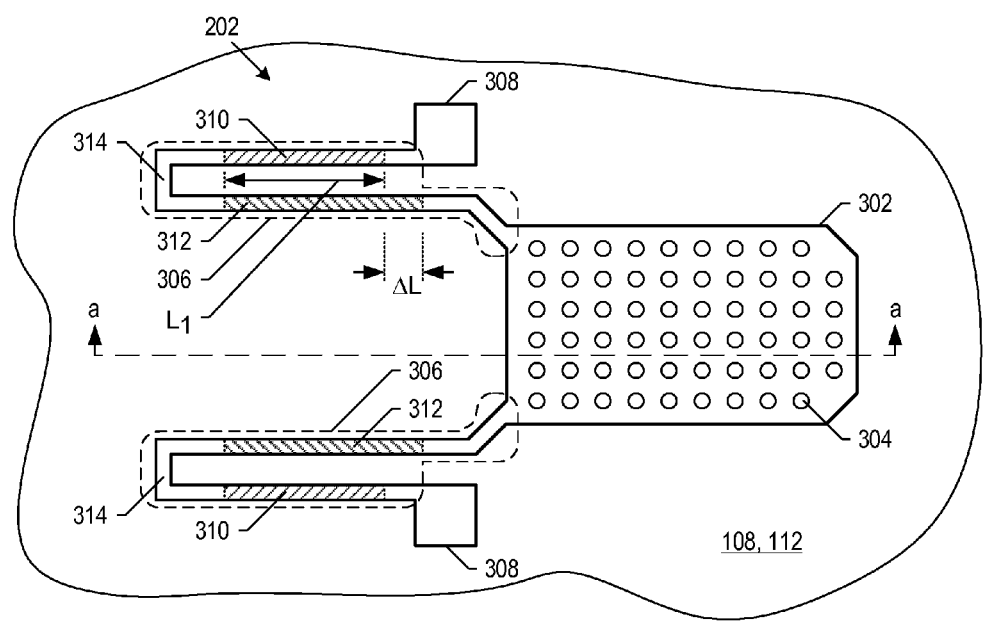
FIG. 3A depicts a plan view of an individual sensor, in its quiescent state, selected from a sensor array, in accordance with the illustrative embodiment of the present invention.
Figure 3B:
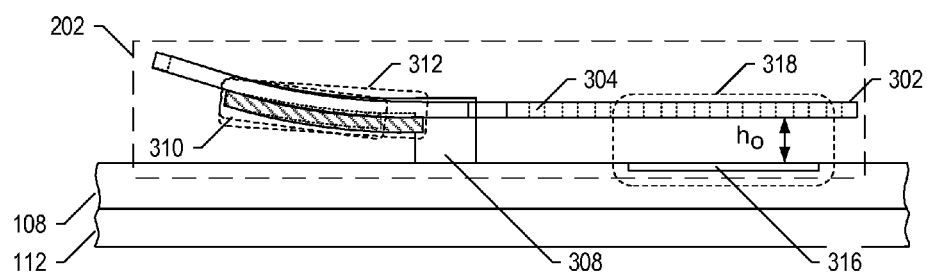
FIG. 3B depicts a cross-sectional view of an individual sensor, in its quiescent state, selected from a sensor array, in accordance with the illustrative embodiment of the present invention.

FIGS. 3A and 3B depict a plan view and cross-sectional view (respectively) of an individual sensor, in its quiescent state, selected from a sensor array, in accordance with the illustrative embodiment of the present invention. The cross-sectional view shown in FIG. 3B is taken through line a-a as shown in FIG. 3A. Sensor 202 comprises plate 302, which is supported above ROIC 108 by support arms 306. Support arms 306 are anchored to the substrate (i.e., ROIC 108) at substrate anchors 308. Each of support arms 306 comprises a substrate thermal bimorph 310, a plate thermal bimorph 312, and a thermal isolator 314.

In some respects, sensor 202 is similar to thermally-compensated radiation sensors known in the prior art, such as those disclosed by Zhao, Ishizuya and Corbeil. In such prior art devices, a sensor plate is supported above a substrate by a support arm that includes two thermal bimorphs. The thermal responses of these bimorphs substantially counteract each other, thereby desensitizing the sensor to changes in ambient temperature. These prior art devices have shown temperature compensation of up to 90-95%.

As in the prior art, sensor 202 comprises support arms that each include two thermal bimorphs. In contrast to the prior art, however, these thermal bimorphs are designed to NOT counteract one another. In fact, a slight difference in responsivity is specifically designed into the devices. Through the addition of a substrate temperature controller, this difference in responsivity is exploited to make the sensitivity of sensor 202 thermally tunable.

Figure 4:
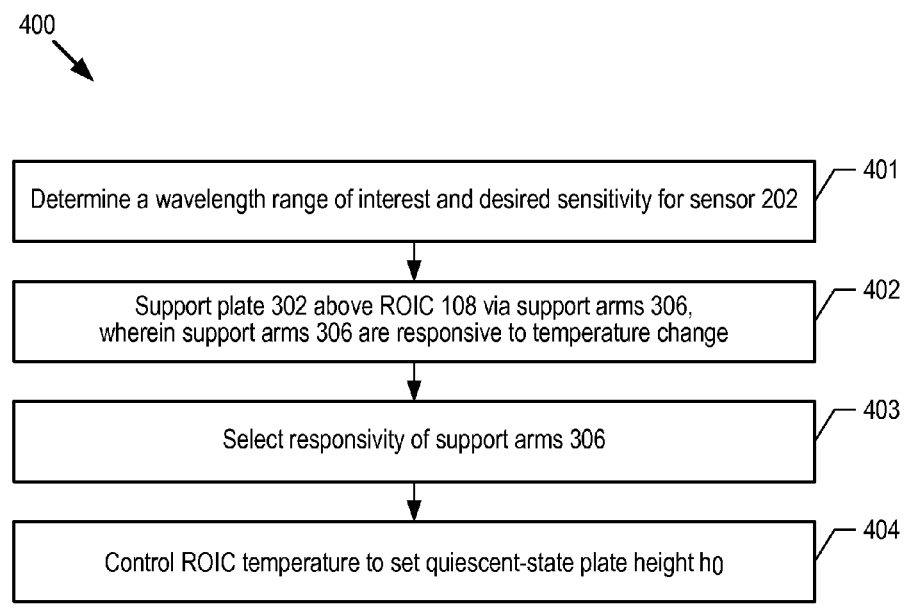
FIG. 4 depicts a method suitable for forming and operating a thermally tunable radiation sensor element, in accordance with the illustrative embodiment of the present invention.

Referring now to FIG. 4 and with continuing reference to FIGS. 3A and 3B, sensor 202 is described in conjunction with method 400, which describes operations suitable for forming and operating sensor 202.

Method 400 begins with operation 401, in which the wavelength range of interest and a desired sensitivity for sensor 202 is determined. The wavelength range of operation and the sensitivity of sensor 202 are functions of the value of quiescent-state plate height $h_o$. The wavelength range of operation and the sensitivity of sensor 202 are also influenced by the design of plate 302.

Plate 302 functions as a radiant-energy absorber and the region between plate 302 and electrode 316 of ROIC 108 forms a resonant cavity that enhances the absorption of radiation in the range of interest. A resonant cavity for radiation within the range of visible light through long wave infrared radiation can be established with proper selection of quiescent-state plate height $h_o$.

Infrared radiation is also absorbed by the materials that compose plate 302. Plate 302 comprises a titanium nitride layer that serves as an impedance matching layer to match the free space impedance of the resonant cavity. The titanium nitride layer also imparts electrical conductivity, which is required for plate 302 to serve as a movable electrode in variable-gap capacitor 318.

In some embodiments, plate 302 comprises an overlying layer of at least one layer of electrically-conductive material and at least one underlying layer of dielectric material. Suitable materials for inclusion in the overlying layer include, without limitation, titanium, titanium-tungsten, titanium-nitride-tungsten, titanium-nitride, chrome, and nichrome. Suitable materials for inclusion in the underlying layer of dielectric material include, without limitation, silicon dioxide, silicon nitride, and silicon oxynitride. The electrically-conductive material and underlying dielectric materials are chosen to provide a free-space impedance match for the electromagnetic radiation of interest. In some embodiments, this impedance match is approximately 377 ohms. In some embodiments, plate 302, support arms 304, and substrate anchors 308 are formed from a continuous layer of the underlying dielectric material. During fabrication, holes 304 serve to enable the delivery of etchant to remove sacrificial material that temporarily underlies plate 302 and support arms 306. The etchant selectively etches the sacrificial material, thereby releasing the plate (and support arms 306) from underlying ROIC 108. In some embodiments, plate 302 also includes ribs (not shown), which add structural rigidity. Substrate anchors 308 are in intimate contact with ROIC 108 (i.e., no sacrificial material temporarily underlies substrate anchor 108). Substrate anchors 308 provide both mechanical contact and electrical contact between support arms 306 and ROIC 108.

At operation 402, plate 302 is supported above ROIC 108 by support arms 306, which are mechanically and electrically connected to ROIC 108 at substrate anchors 308.

Support arms 306 each comprise a substrate thermal bimorph 310 and a plate thermal bimorph 312. A highly thermally conductive layer (not shown) provides a low thermal resistance path between substrate thermal bimorph 310 and substrate anchor 308. In similar fashion, a highly thermally conductive layer (not shown) provides a low thermal resistance path between plate thermal bimorph 312 and plate 302. By virtue of these thermally conductive layers, substrate thermal bimorph 310 remains at substantially the same temperature as ROIC 108, while plate thermal bimorph 312 remains at substantially the same temperature as plate 302.

In some embodiments, each of substrate thermal bimorph 310 and plate thermal bimorph 312 includes a layer of material having a relatively higher thermal expansion coefficient (TEC) disposed below a material having a relatively lower TEC. In some embodiments, the bimorphs comprise a metal, such as aluminum or gold, disposed beneath a dielectric layer (s), such as silicon dioxide and/or silicon oxynitride and/or silicon nitride and/or hydrogenated amorphous silicon carbide. The length of this metal layer defines the length of the bimorph.

At operation 403, the responsivity of support arms 306 is selected. In some embodiments, the responsivity of each of support arms 306 is a function of the difference in the responsivity of its substrate thermal bimorph 310 and plate thermal bimorph 312. In some embodiments, the responsivity of each of support arms 306 is a function of a difference in the length of substantially thermally-insensitive links attached to each of the bimorphs.

The responsivity of the bimorph is a function of its length. Substrate thermal bimorph 310 has a length $L_1$, and plate thermal bimorph 312 has a length equal to the sum of $L_1$ plus nonzero offset length $\Delta L$. In some embodiments $\Delta L$ is a negative number and plate 302 will move toward ROIC 108 with increasing temperature. In some embodiments $\Delta L$ is a positive number and plate 302 will move away from ROIC 108 with increasing temperature.

In some embodiments, the material with the relatively lower TEC is a dielectric, such as, without limitation, a silicon oxide, silicon oxynitride, other low TEC oxides of silicon, silicon nitride. In some embodiments, the material with the relatively lower TEC is a semiconductor, such as, without limitation, amorphous silicon carbide, amorphous hydrogenated silicon carbide, and amorphous silicon. It will be appreciated by those skilled in the art that any of a wide variety of materials can be selected, as a function of application specifics, to provide the relatively-lower and relatively-higher TEC layers of a thermal bimorph in accordance with the illustrative embodiment of the present invention. For example, the material having the relatively higher TEC does not need to be limited to metals. In particular, high TEC plastics and polymeric materials can be used. A non-limiting list of examples of such non-metallics include: polycarbonate, polypropylene, polyethylene, Teflon, nylon, Lucite, polyamide, and various types of photoresist.

Since the metal layer, which has the relatively higher TEC, is located beneath the dielectric layer, which has the relatively lower TEC, thermal bimorphs 310 and 312 will bend "upwards" (i.e., away from ROIC 108) in response to increasing temperature. Upward bending is advantageous because it improves dynamic range, since greater range of movement is permitted. Also, upward movement decreases the likelihood of inadvertent contact with the substrate, which is likely to result in stiction (i.e., permanent attachment of the movable element to the substrate). Of course, the material layers can be inverted (i.e., layer with the lower TEC beneath the layer with the higher TEC) to provide downward bending upon heating, if desired.

The responsivity of a thermal bimorph is a function of its length and temperature. Nonzero offset length $\Delta L$, therefore, enables the control of quiescent-state plate height $h_o$ through control of the temperature of the substrate and plate thermal bimorphs. In some embodiments, $\Delta L$ is made small to enable fine thermal control of $h_o$. In some embodiments, $\Delta L$ is made large to enable coarse thermal control of $h_o$.

Although the illustrative embodiment comprises a sensor wherein plate 302 is parallel to the substrate (i.e., ROIC 108) when the plate is in its quiescent state, it will be clear to those skilled in the art, after reading this specification, how to make and use alternative embodiments of the present invention wherein plate 302 is in a non-parallel relationship with the substrate when plate 302 is in its quiescent state. It will be apparent to those skilled in the art that in these alternative embodiments, thermal tuning can be used to control the separation distance and/or angle between plate 302 and ROIC 108.

Thermal isolator 314 interposes and impedes the flow of heat between substrate thermal bimorph 310 and plate thermal bimorph 312. In some embodiments, thermal isolator 314 comprises the same material as the underlying dielectric layer that composes plate 302. The thermal conductance of thermal isolator 314 is defined as $G_{th}=2K_{th}A_d/L$, where $K_{th}$ is the thermal conductance of the material that composes thermal isolator 314, $A_d$ is the cross sectional area of thermal isolator 314, and L is its length. The rate of heat flow between the bimorphs, therefore, is inversely proportional to the length of thermal isolator 314.

Since plate thermal bimorph 312 is connected to plate 302 via a highly thermally conductive path (i.e., is "thermally shorted"), the rate at which heat flows between them is very high. Therefore, plate thermal bimorph 312 responds quickly when plate 302 converts absorbed radiation into heat. Such rapid response is typically desirable. Similarly, since substrate thermal bimorph 310 is thermally shorted to ROIC 108, it responds quickly to changes in substrate temperature. The thermal response time across each of substrate thermal bimorph 310 and plate thermal bimorph 312 is typically within the range of 0.5 to 10 microseconds.

Typically, substrate thermal bimorph 310 and plate thermal bimorph 312 have responsivities that are very similar and they are arranged so as to operate in opposition to one another. As a result, in order to enable sensor 202 to detect incident radiation, the radiation must cause a thermal gradient to exist between the two thermal bimorphs. To that end, thermal isolator 314 is located between the thermal bimorphs. The thermal conductance of thermal isolator 314 determines the rate at which the sensor responds to absorbed radiation versus the rate at which the device will respond to substrate temperature changes. The value of its thermal conductivity is chosen to achieve a desired ratio between sensitivity to substrate temperature and speed of response to incident radiation.

Since thermal isolator 314 retards the flow of heat from the substrate into plate thermal bimorph 312, it mitigates the effects of slow substrate temperature variations on the output of sensor 202. On the other hand, it does allow heat to flow, albeit slowly, between substrate thermal bimorph 310 and plate thermal bimorph 312. As it result, it enables slow closed-loop control over the quiescent-state plate height $h_o$ by controlling the temperature of ROIC 108 via temperature controller 112.

For typical sensor designs, the thermal response time across thermal isolator 314 is within the range of 1 to 30 milliseconds. In some embodiments, the thermal conductance of thermal isolator 314 is made small to increase the thermal isolation between substrate thermal bimorph 310 and plate thermal bimorph 312. In some embodiments, the thermal conductance of thermal isolator 314 is made large to decrease the thermal isolation between substrate thermal bimorph 310 and plate thermal bimorph 312.

In some embodiments, quiescent-state plate height $h_o$ is also a function of a material stress and/or a material stress gradient through the thickness of thermal isolator 314. The stress and stress gradient in a thin-film material (e.g., silicon dioxide, silicon oxynitride, and the like) can be selected by appropriately selecting the conditions under which it is deposited, such as deposition temperature, precursor gasses, substrate temperature, etc. Quiescent-state plate height $h_o$ can be controlled, therefore, by selection of a material stress and/or material stress gradient.

In some embodiments, thermal isolator 314 comprises corrugations. A corrugated thermal isolator provides improved mechanical performance such as:

i. higher stiffness; or ii. improved flatness; or iii. higher resonant frequency; or iv. higher pull-in voltage; or v. higher sensitivity; or vi. any combination of i, ii, iii, iv, and v.

In some embodiments, thermal isolator 314 comprises stiffening elements such as bossed structures, ribs, and the like to improve its stiffness.

In some embodiments wherein thermal isolator 314 comprises corrugations, the effect of material stress in thermal isolator 314 on $h_o$ is enhanced by the corrugated structure.

In some embodiments, support arm 306 includes a second thermal isolator between substrate thermal bimorph 310 and substrate anchor 308. In these embodiments, selection of the material stress and/or stress gradient in this second thermal isolator can also be used to control $h_o$.

At operation 404, temperature controller 112 controls the temperature of substrate thermal bimorph 310 and plate thermal bimorph 312. The responsivity of sensor 202 to temperature controller 112 is a function of nonzero offset length ΔL and the thermal conductance of thermal isolator 314. In some embodiments, temperature controller 112 comprises a temperature control circuit and a simple substrate heater that is bonded to ROIC 108. In some embodiments, temperature controller 112 is a thermo-electric cooler capable of either heating or cooling ROIC 108. In some embodiments, temperature controller 112 is a source of radiant energy for remotely heating ROIC 108. It will be clear to those skilled in the art, after reading this specification, how to make and use temperature controller 112.

Figure 5A:
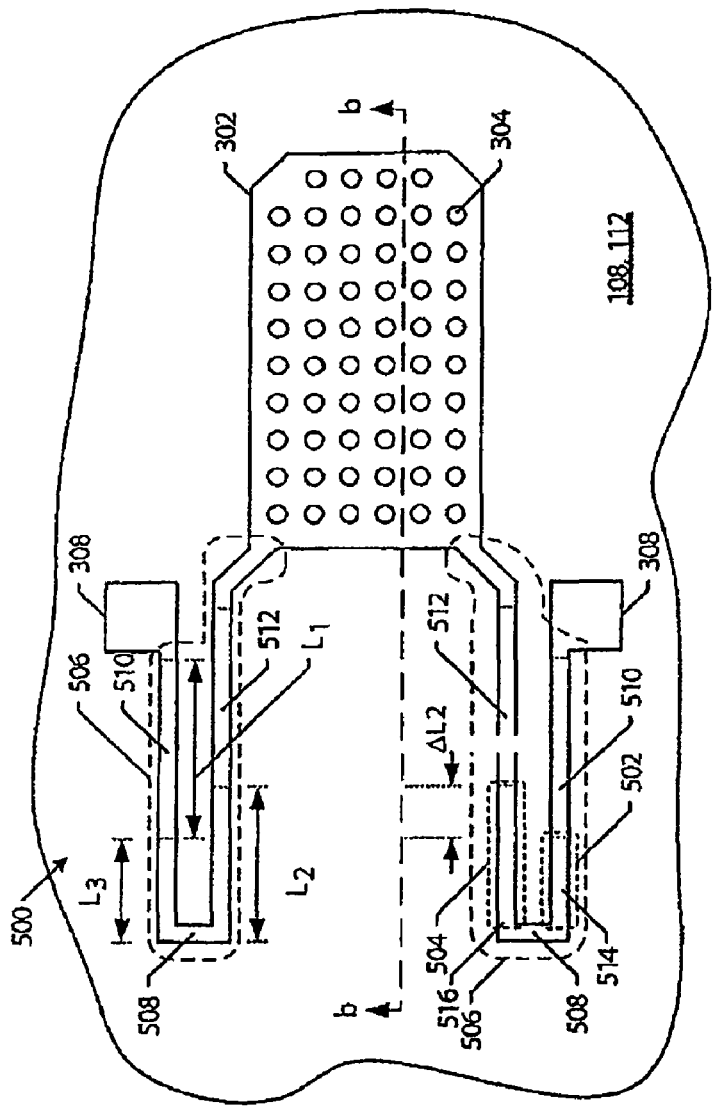
FIG. 5A depicts a plan view of an individual sensor, in its quiescent state, selected from a sensor array, in accordance with an alternative embodiment of the present invention.
Figure 5B:
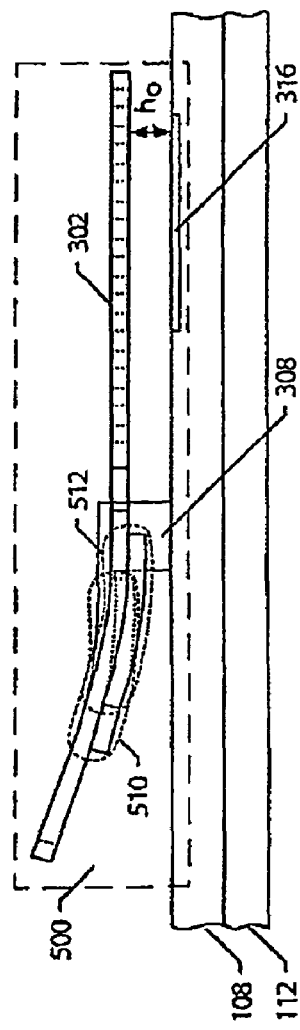
FIG. 5B depicts a cross-sectional view of an individual sensor, in its quiescent state, selected from a sensor array, in accordance with an alternative embodiment of the present invention.

FIGS. 5A and 5B depict a plan view and cross-sectional view (respectively) of an individual sensor, in its quiescent state, selected from a sensor array, in accordance with an alternative embodiment of the present invention. The cross-sectional view shown in FIG. 5B is taken through line b-b as shown in FIG. 5A. Sensor 500 comprises plate 302, support arms 506, and substrate anchors 308.

Support arms 506 each comprise a substrate thermal actuator 502 and a plate thermal actuator 504. Substrate thermal actuator 502 comprises a substrate thermal bimorph 510, and a substrate arm link 514. The length of substrate thermal actuator 502 is equal to the sum of the length of substrate thermal bimorph 510 and the length of substrate arm link 514. In similar fashion, plate thermal actuator 504 comprises a plate thermal bimorph 512 and a plate arm link 516. The length of plate thermal actuator 504 is equal to the sum of the length of plate thermal bimorph 512 and the length of plate arm link 516. The bimorphs are analogous to substrate thermal bimorph 310 and plate thermal bimorph 312 described above and with respect to FIGS. 3A and 3B. In some embodiments, such as that depicted in FIGS. 5A and 5B, substrate thermal bimorph 510 and plate thermal bimorph 512 have lengths that are substantially the same.

Support arms 506 each comprise a substrate thermal actuator 502 and a

Substrate arm link 514 and plate arm link 516 together compose a portion of thermal isolator 508. Substrate arm link 514 and plate arm link 516 are substantially thermally-insensitive lengths that comprise layers of dielectric material. Thermal isolator 508 is formed from the same dielectric material that composes plate 302. The lengths of substrate arm link 514 and plate arm link 516 differ by nonzero offset length ΔL2; therefore, the lengths of substrate thermal actuator 502 and plate thermal actuator 504 also differ by nonzero offset length ΔL2. By virtue of nonzero offset length ΔL2, the vertical displacement achieved by the actuation of each of substrate thermal bimorph 510 and plate thermal bimorph 512 differs (i.e., the responsivity of each of thermal actuators 502 and 504 is different). As a result, quiescent-state plate height $h_o$ can be thermally tuned with temperature controller 112.

In some embodiments, substrate thermal bimorph 510 and plate thermal bimorph 512 have different lengths, so as to further increase the responsivity of support arms 506.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A sensor for sensing electromagnetic radiation comprising:
   (1) a plate for converting incident radiation into heat, wherein said plate is physically adapted to conduct electricity and to conduct heat; and
   (2) a support arm for supporting said plate at a height above a substrate, wherein said support arm comprises:
      (a) a first portion of said support arm forming a first thermal actuator having a first responsivity, wherein a second portion of said support arm disposed between said plate and said first thermal actuator is physically adapted to conduct heat at a first flow rate between said plate and said first thermal actuator; and
      (b) a third portion of said support arm forming a second thermal actuator having a second responsivity, and a fourth portion of said support arm disposed between said plate and said second thermal actuator is physically adapted to conduct heat at a second flow rate between said substrate and said second thermal actuator;
   wherein said second responsivity is selected to be equal to the sum of said first responsivity and a nonzero offset responsivity, said first responsivity and said second responsivity being selected such that thermal responses of said first and second thermal actuators do not counteract each other; and wherein said height is a function of said nonzero offset responsivity and a temperature of said substrate; and
   (3) a temperature controller for tuning a sensitivity of the sensor by utilizing the offset responsivity.

2. The sensor of claim 1 wherein said nonzero offset responsivity has a value within the range of 0.05% of said first responsivity to 50% of said first responsivity.

3. The sensor of claim 1 wherein said first thermal actuator comprises a first thermal bimorph having a first length, and wherein said second thermal actuator comprises a second thermal bimorph that is dimensioned to have a second length that is equal to the sum of said first length and a nonzero offset length, and further wherein said nonzero offset responsivity is a function of said nonzero offset length.

4. The sensor of claim 3 wherein said nonzero offset length has a value within the range of 0.05% of said first length to 50% of said first length.

5. The sensor of claim 3 wherein said support arm further comprises a first thermal isolator for restricting the flow of heat between said first thermal bimorph and said second thermal bimorph to a third flow rate, wherein said third flow rate is lower than either of said first flow rate and said second flow rate.

6. The sensor of claim 5 wherein said support arm further comprises a second thermal isolator wherein said second thermal isolator is disposed between said second thermal bimorph and said substrate, and wherein said second thermal isolator is selected to have a material stress, and further wherein said height is a function of said material stress.

7. The sensor of claim 5 wherein at least a portion of said first thermal isolator has a plurality of corrugations, and wherein said corrugations extend fully through said support arm such that they are defined in both a top surface and a bottom surface thereof.

8. The sensor of claim 1 wherein said first thermal actuator comprises a first thermal bimorph having a third responsivity and a first link having a first length;
　　wherein said second thermal actuator comprises a second thermal bimorph having a fourth responsivity and a second link that is dimensioned to have a second length that is equal to the sum of said first length and a nonzero offset length; and
　　wherein said first link and said second link are mechanically-coupled.

9. The sensor of claim 8 wherein said third responsivity and said fourth responsivity are unequal.

10. A method for tuning the sensitivity of an electromagnetic radiation sensor comprising:
　　determining a desired sensitivity, wherein said sensitivity is a function of a height of a plate above a substrate;
　　providing a support arm for supporting said plate at said height, wherein said support arm is characterized by a responsivity to a temperature of said substrate; said support arm comprising a first thermal actuator having a first responsivity and a second thermal actuator having a second responsivity; sensitivity being tunable utilizing a difference of said first responsivity and said second responsivity; said first responsivity and said second responsivity being selected such that thermal responses of said first and second thermal actuators do not counteract each other
　　selecting said responsivity such that said plate is supported at said height at a temperature within a temperature range; and
　　obtaining the desired sensitivity by controlling said temperature within said temperature range.

11. The method of claim 10 wherein said responsivity is selected by:
　　mechanically-coupling a first leg and a second leg, wherein said first leg comprises a first thermal bimorph and a first link having a first length, and wherein said first link is substantially thermally-insensitive, and wherein said second leg comprises a second thermal bimorph and a second link having a second length, and further wherein said second link is substantially thermally-insensitive; and
　　selecting first length and said second length such that said first length and said second length are unequal.

12. The method of claim 10 wherein said responsivity is selected by mechanically-coupling a first thermal bimorph and a second thermal bimorph, wherein said first thermal bimorph and said second thermal bimorph have unequal responsivities.

13. The method of claim 12 further comprising:
　　providing a first path for heat flow between said plate and said first thermal bimorph, wherein said first path has a first thermal conductance;
　　providing a second path for heat flow between said substrate and said second thermal bimorph wherein said second path has a second thermal conductance;
　　providing a third path for heat flow between said first thermal bimorph and said second thermal bimorph; and
　　selecting a third thermal conductance such that said third thermal conductance is lower than each of said first thermal conductance and said second thermal conductance.

14. The method of claim 13 further comprising:
　　interposing said substrate and said second thermal bimorph with a first link that is substantially thermally-insensitive, wherein said first link is characterized by a material stress, and further wherein said height is a function of said material stress; and
　　selecting said material stress such that said support arm supports said plate at said height.

* * * * *